United States Patent Office 3,479,809
Patented Nov. 25, 1969

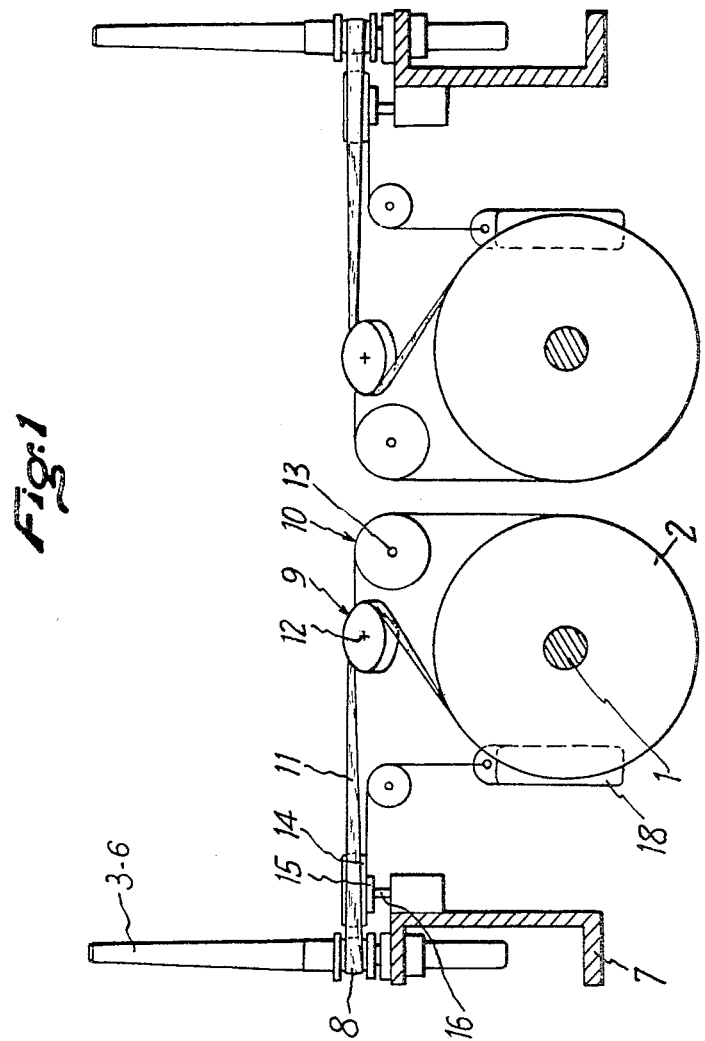

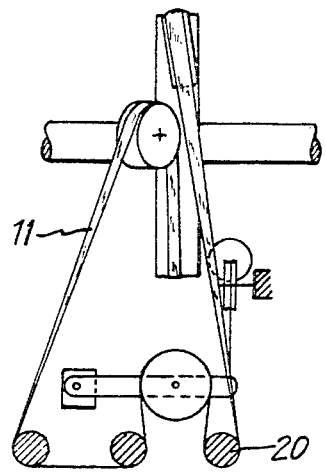
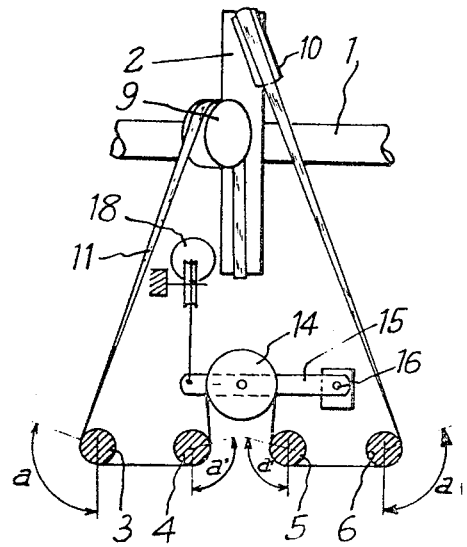
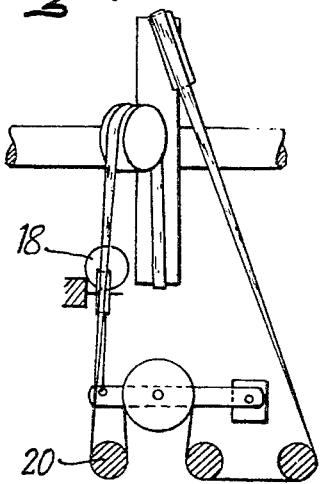

3,479,809
BELT DRIVE FOR SPINDLES ON CONTINUOUS SPINNING OR TWISTING FRAMES
Jean-Frederic Herubel, Guebwiller, France, assignor to N. Schlumberger & Cie, Guebwiller, Haut-Rhin, France, a French societe
Filed Sept. 29, 1967, Ser. No. 671,657
Claims priority, application France, Oct. 11, 1966, 79,448
Int. Cl. D01h *13/00;* F16h *7/00*
U.S. Cl. 57—105      8 Claims

ABSTRACT OF THE DISCLOSURE

Apparatus for driving spindles on continuous spinning or twisting frames comprising a belt passing round a driving pulley and round spindles arranged in a line in pairs or with a solitary end spindle, guide pulleys associated with the driving pulley guiding the belt to and from the end spindles of the row and the belt passing between the pairs of spindles, or between a pair of spindles and a solitary spindle, over a tension roller, the arrangement maintaining the belt in contact with approximately the same arc of the wharve on each spindle.

BACKGROUND OF THE INVENTION

The subject matter of the present inventions is apparatus for driving by a belt, such as a strap or band, the spindles of continuous spinning or twisting frames, and comprising endless driving means which preferably drive four spindles all at once.

Drives are already known in which the spindles are driven in groups of four. The driving belt passes over a driving pulley arranged in such a way that the belt centres itself on the wharve of the first spindle. It embraces successively the other three spindles whilst passing over a tension roller located between the second and third spindle. Another return roller is necessary to guide the belt, after it has passed over the fourth spindle, back onto the driving pulley. This drive has various disadvantages. The arc of contact of the belt on the wharve of the spindle is different from one spindle to another; in fact, the arc of contact on the fourth spindle, the furthest away from the driving pulley, is greater than the arc of contact on the three others. The consequence is that at the time of any interference with the rotation of a given spindle, and more especially of the fourth spindle, the belt finds itself braked too brutally and this causes a drop in the speed of rotation of the other spindles of the group. This is detrimental to the quality of the yarn, the torsion per unit of length of yarn becoming less than the normal value.

It is moreover necessary for the belt to work without creeping. To this end, the belt must embrace the maximum arc on the driving pulley. For this reason a return pulley arranged in front of the driving pulley is used. This arrangement has the disadvantage of taking up a relatively large floor-space which is all the more inconvenient where a continuous frame having a double face, each face having an independent drive for the spindles is concerned.

Further, to take care of the belts it is of interest to have the same arc of contact on each spindle in such a way that the tension of the belt can be the same on the various lengths of belt formed on its route through the apparatus. To mitigate these difficuties it has been proposed that the spindles be driven individually. Such a drive has the disadvantage of being too complicated in view of the large number of spindles on a spinning frame.

SUMMARY OF THE INVENTION

The purpose of the present invention is to provide a driving device intended more especially, but not exclusively, for the drive of four spindles, and in which the arcs of contact of the belt, strap or band with the wharves of the spindles are substantially equal, in which the arc of contact on the driving pulley is large, whose construction is compact and in which the number of guide pulleys is minimal.

To that end, in accordance with the invention, at least a pair of spindles are associated with the driving pulley and guide means are provided for guiding the belt towards one spindle of each pair and away from the other spindle of each pair such that the arc of contact of the belt with the wharve of each pulley is substantially the same.

In the case of four spindles, these are arranged in line in two pairs and the driving pulley is preferably arranged so that its plane coincides with the plane of symmetry between the two pairs of spindles.

The entire driving pulley may be located largely below the level of the wharves of the spindles, thus contributing towards ensuring that only a small floor-space is occupied by the device.

The driving pulley may be associated with two guide pulleys or deflecting rollers placed above the driving pulley and whose axes are situated, with regard to a plane parallel to the spindles and passing through the shaft of the driving pulley, on the side of the said plane remote from the spindles.

In this way the driving shaft bearing the driving pulley can be located closer to the spindle carrier members, thus reducing the floor-space occupied by the machine. This advantage is chiefly of interest for the drive of the pulleys on spinning frames having independent faces.

The working position of the axis of the tension roller is preferably located substantially in the median plane of the driving pulley thus contributing towards ensuring the symmetry of the angles of contact of the belt on the wharves of the spindles.

In the case of a group of three spindles, the median plane of the driving pulley containing the shaft of the tension roller is arranged to pass equidistantly between two spindles of the group. This arrangement ensures that the assembly has the same advantages as are obtained in the case of a group of four spindles.

In the case of a group of two working spindles, the arrangement is the same as with a group of three spindles but one working spindle is replaced by a "false spindle" constituted, for example, by a guide pulley preferably having the same diameter as the wharves of the other spindles. This arrangement allows the advantages of the aforesaid arrangements to be retained.

It must also be noted that the above arrangements allow the direction of rotation of the spindle to be reversed, without the slightest interference for adjustment and with no risk of malfunctioning of the belts.

BRIEF DESCRIPTION OF THE DRAWINGS

Embodiments of the invention will be described in more detail hereunder, by way of example only and with reference to the attached drawings, in which:

FIG. 1 shows a partial section of a spinning frame embodying a drive according to the invention;

FIG. 2 shows the drive of FIG. 1 connected to an assembly of four spindles in a view from above; and FIGS. 3 and 4 show a similar drive reduced to two spindles.

DESCRIPTION OF THE PREFERRED EMBODIMENTS

The embodiment of FIG. 1 comprises a driving shaft 1 on which is fixed a driving pulley 2. Spindles 3, 4, 5, 6 are mounted on a spindle carrier beam 7 arranged parallel to the driving shaft and at short distance from the latter. The spindles are arranged in line in two pairs 3, 4 and 5, 6 (FIG. 2). The position in height of the shaft 1 and beam 7 is such that the driving pulley is located largely below a horizontal line on a level with the wharves 8 of the spindles. Two guide pulleys 9 and 10 located above the driving shaft control the belt 11 in its path around the driving pulley. The axes 12 and 13 of these two rollers are located, with regard to a vertical plane passing through the driving shaft, on the side of the said plane remote from the spindles 3, 4, 5, 6.

A tension roller 14 mounted on an arm 15 pivoted on an axle 16 fixed to the spindle carrier beam 7 and urged by a counterweight 18 in the direction towards the driving shaft 1 enables the belt to be kept taut. The tension assembly is arranged in such a way that the axis of the tension roller when in the normal working position is located in the vertical plane passing through the middle plane of the driving pulley. Further, this tension device enables relatively large elongations of the belt to be absorbed without influencing the tension of the belt.

The belt embraces successively the various components enumerated and can turn equally in both directions. In fact, the belt extends from the driving pulley over the guide pulley 9 to one end spindle 3 of the line and after passing round the spindles and the tension pulley extends back to the driving pulley over the guide pulley 10 from the other end spindle 6 of the line.

As far as either pair of spindles 3, 4 or 5, 6, is concerned, the tension roller assembly serves as guide means co-operating with the corresponding guide pulley 9 or 10 to guide the belt from the driving pulley to and from the pair of pulleys in such a way that the arc of contact of the belt with each pulley of the pair is the same.

The trajectory of the belt in this embodiment has the following advantages:

(a) The arc of contact (a, FIG. 2) between the belt and the wharve of the spindle is substantially constant from one spindle to another.

It will be understood that in these conditions, contrary to the known devices, when the spindle is braked, the effect on the belt is the same whichever spindle is braked, and only slightly influences the equilibrium of the drive. In practice, the drop in speed of the other spindles when one of them is braked remains very slight and enables normal performance to be maintained.

(b) Despite the relative positions of the spindles and of the driving pulley, the belt embraces this latter over a large arc, whence the belt moves without creeping.

(c) The belt itself is subjected to careful treatment over the whole of its trajectory.

In certain specific cases, and more especially for driving two spindles only, one pair of spindles is replaced by a "false spindle" 20 (FIGS. 3 and 4). This mounting is used at the ends of a machine so as to be able to make use of the advantages of the present drive without, however, losing from the point of view of floor-space occupied.

In the embodiments of FIGS. 3 and 4 the trajectory of the belt is substantially preserved due to the presence of the "false spindle" constituted by a further guide pulley whose diameter is equal to that of the wharves of the other spindles.

The "false spindle" could, of course, be replaced by a normal working spindle.

I claim:

1. Apparatus for driving spindles in continuous spinning or twisting frames comprising a driving pulley, at least three spindles for said driving pulley, a belt passing around said pulley and around the wharves of said spindles, and guide means for guiding the belt between said driving pulley and said spindles, the improvement comprising said spindles arranged in line, said guide means arranged for guiding said belt from said driving pulley to a first one of said spindles and from a last one of said spindles to said driving pulley so that the arc of contact of said belt with the wharve of each said spindle is at least approximately the same, and said driving pulley being located so that its plane of rotation coincides with a plane passing between two of said spindles.

2. Apparatus for driving spindles in continuous spinning or twisting frames comprising a driving pulley, two identical pairs of spindles for each said driving pulley, a belt passing around said pulley and around the wharves of said spindles, and guide means for guiding the belt between said driving pulley and spindles, the improvement comprising said spindles arranged in line, said guide means arranged for guiding said belt from said driving pulley to a first one of said spindles and from a last one of said spindles to said driving pulley so that the arc of contact of said belt with the wharve of each said spindle is at least approximately the same, and said driving pulley being located so that its plane of rotation coincides with the plane of symmetry of said pairs of spindles.

3. Apparatus according to claim 2, wherein said guide means comprises:

two guide pulleys associated with said driving pulley, one of said guide pulleys guiding the belt from the driving pulley to one end spindle of said line of spindles and the other guide pulley guiding the belt from the other end spindle of the said line to the driving pulley; and a tension pulley located with its axis at least approximately in the median plane of the driving pulley and between said pulley and the spindles, said belt passing around said tension pulley from a spindle of one of said pairs of spindles to a spindle of the other pair of spindles.

4. Apparatus according to claim 3, wherein said driving pulley is located below a horizontal plane through the wharves of the spindles with its axis parallel to the line of the spindles, and said two guide pulleys are located, with regard to a plane parallel to the line of spindles and passing through the said axis of the driving pulley, on the side of said plane remote from said spindles.

5. Apparatus for driving spindles in continuous spinning or twisting frames comprising a driving pulley, a single pair of spindles and a third spindle associated with said driving pulley, a belt passing around said pulley and around the wharves of said spindles, and guide means for guiding the belt between said driving pulley and said spindles, the improvement comprising said spindles arranged in line, said guide means arranged for guiding said belt from said driving pulley to a first one of said spindles and from a last one of said spindles to said driving pulley so that the arc of contact of said belt with the wharve of each said spindle is at least approximately the same, and said driving pulley being located so that its plane of rotation passes between said third spindle and the spindle of said pair of spindles adjacent said third spindle.

6. Apparatus according to claim 5, wherein said guide means comprises:

two guide pulleys associated with said driving pulley, one of said guide pulleys guiding the belt from the driving pulley to one end spindle of said line of spindles and the other guide pulley guiding the belt from the other end spindle of the line to the driving pulley; and a tension pulley located with its axis at least a approximately in the median plane of the driving pulley and between the said pulley and the spindles, said belt passing around said tension pulley from the spindle of said pair adjacent the third pulley to the third pulley.

7. Apparatus according to claim 6, wherein said driving pulley is located below a horizontal plane through the wharves of the spindles with its axis parallel to the line of the spindles, and said two guide pulleys are located, with regard to a plane parallel to the line of spindles and passing through the said axis of the driving pulley, on the side of said plane remote from said spindles.

8. Apparatus according to claim 7, wherein said third spindle is a "false spindle" constituted by a further guide pulley.

References Cited

UNITED STATES PATENTS 1,707,916  4/1929  Leonard _____ 57—105

FOREIGN PATENTS

| 171,138 | 11/1921 | Great Britain. |
| 859,715 | 1/1961 | Great Britain. |
| 862,592 | 3/1961 | Great Britain. |
| 402,556 | 11/1941 | Italy. |
| 461,581 | 6/1951 | Italy. |
| 274,196 | 5/1948 | Switzerland. |

DONALD E. WATKINS, Primary Examiner

U.S. Cl. X.R.

74—219